W. PURDY.
HAME-FASTENER.
No. 176,680.
Patented April 25, 1876.
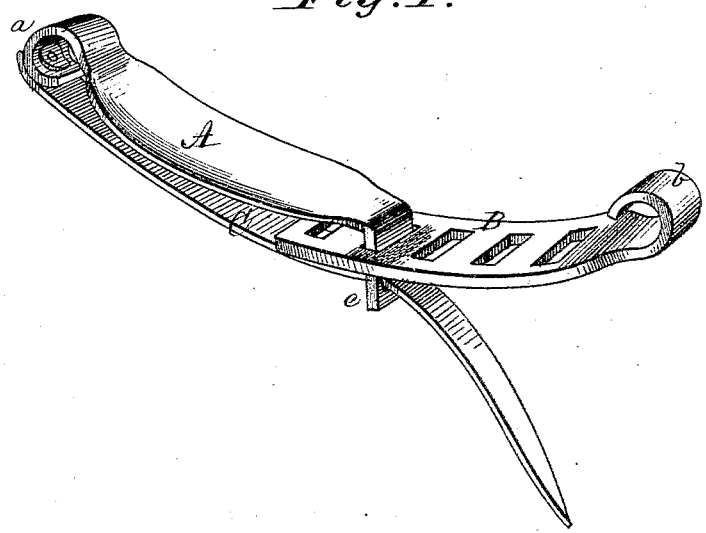
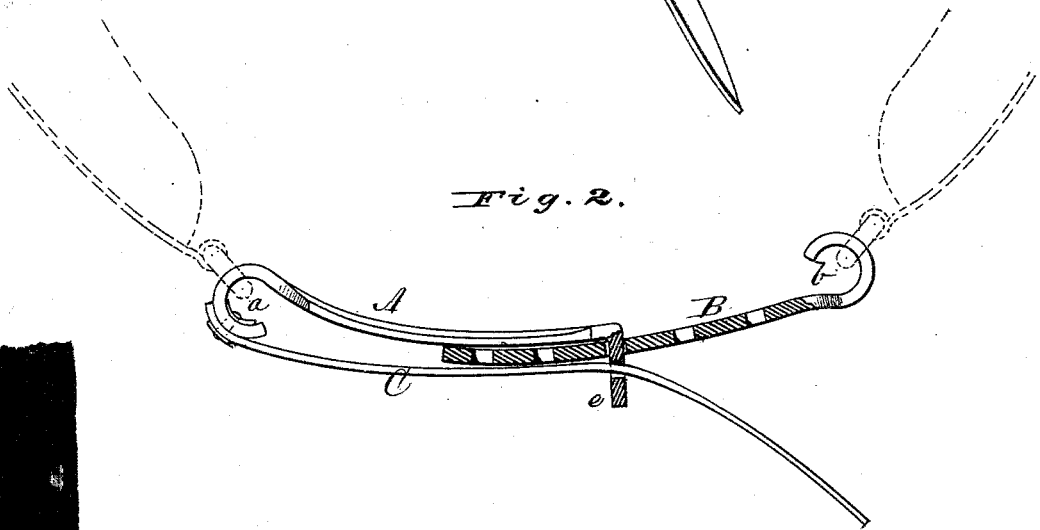

UNITED STATES PATENT OFFICE.

WILLIAM PURDY, OF SCIOTO, OHIO.

IMPROVEMENT IN HAME-FASTENERS.

Specification forming part of Letters Patent No. 176,680, dated April 25, 1876; application filed March 16, 1876.

*To all whom it may concern:*

Be it known that I, WILLIAM PURDY, of Scioto, Scioto county, State of Ohio, have invented an Improvement in Hame-Fasteners; and I do hereby declare the following to be a full and correct description of the same, reference being had to the accompanying drawings, in which—

Figure 1 is a perspective view of my invention, and Fig. 2 is a side view partly in section.

The object of my invention is to produce a fastener for hames which will be not only readily fastened and unfastened, but will be strong and secure, and will not be liable to unfasten in use.

My invention consists in applying to one end of a hame a link, having a series of slots, into which a hook upon the end of the link, applied to the end of the opposite hame, is hooked, and a leather thong, attached to one end of the hame-fastener, is passed through the eye of the hook, and prevents the parts from becoming separated.

In the drawings, A is a link, having a hook, *a*, at one end to hook into the eye of the hame, and at the other end a projection, *e*, at right angles, or nearly so, to the body of the link, and is provided with an eye for a key to pass through. B is also a link, with a similar hook, *b*, to hook into the eye of the opposite hame, and is provided, through its entire length, with a series of slots, either of which will admit the hook *e*. The links A and B are curved in the arc of a circle to make them conform to the shape of the horse's collar. Riveted to the end of the links, as at *a*, is a leather thong or key, C, of sufficient length to pass through the eye in the hook *e*.

The operation of my invention is as follows: Having hooked the hooks *a* and *b* into the eyes in the ends of the hame, and adjusted the hame upon the collar upon the horse's neck, the two links are brought together until the projection *e* upon the link A enters one of the slots in the link B. The leather key C is then passed through the eye in the projection *e*, and the hame is securely fastened.

Having thus fully described my invention, what I claim, and desire to secure by Letters Patent, is—

In a hame-fastener, the combination of the link A, provided with the angular hook *e*, the link B, provided with a series of slots, and a leather thong or key, C, substantially as described.

The above specification of my said invention signed and witnessed at Scioto this 11th day of March, A. D. 1876.

WILLIAM PURDY.

Witnesses:
DAVID KALNER,
JOHN KALNER.